No. 875,693. PATENTED JAN. 7, 1908.
H. COTTRELL.
VEHICLE SPRING CHECK.
APPLICATION FILED JAN. 9, 1907.
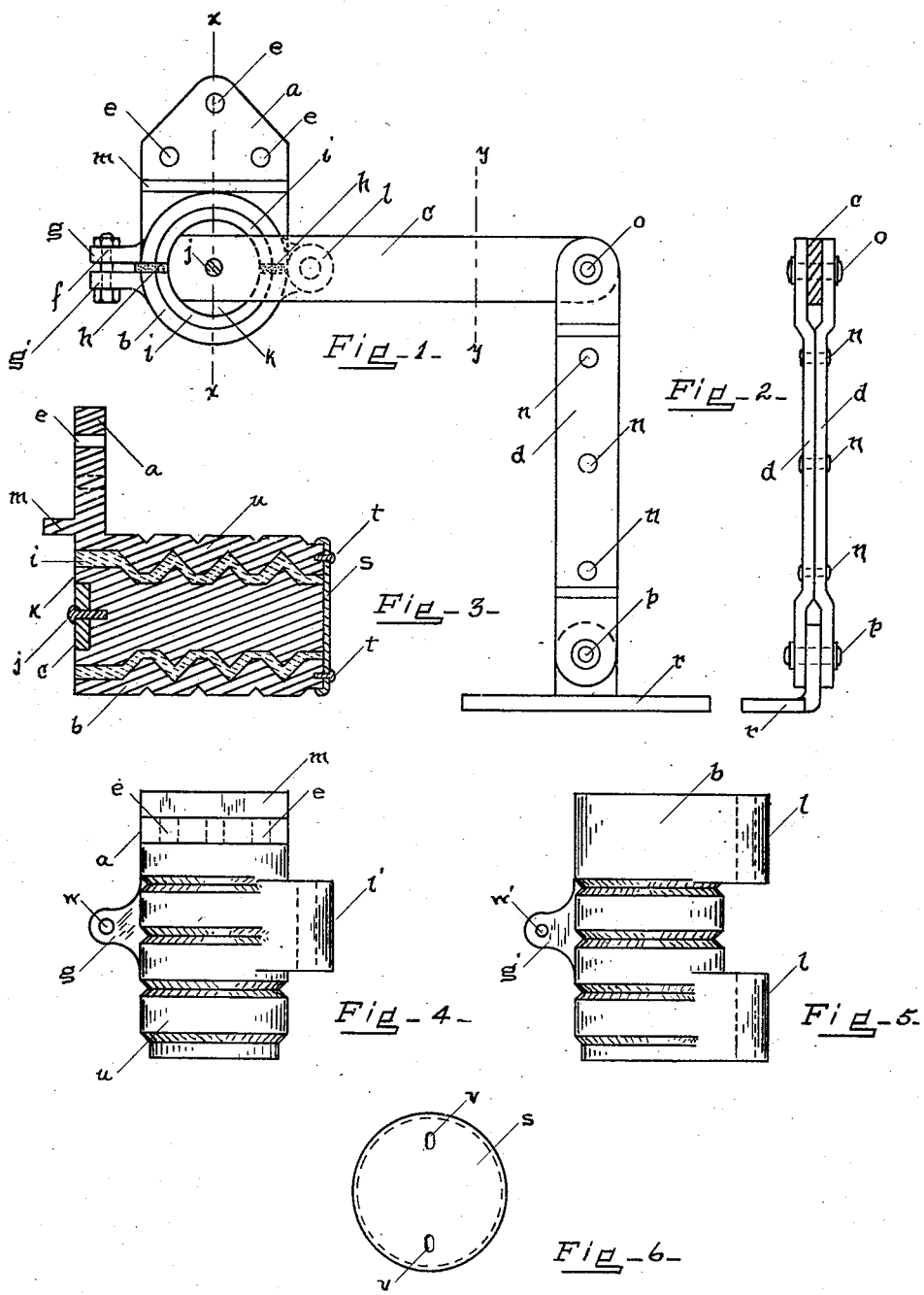
WITNESSES:
Howard C. Cottrell.
Jennie M. Crooke.
INVENTOR
Herbert Cottrell

UNITED STATES PATENT OFFICE.

HERBERT COTTRELL, OF NEWARK, NEW JERSEY.

VEHICLE-SPRING CHECK.

No. 875,693.     Specification of Letters Patent.     Patented Jan. 7, 1908.

Application filed January 9, 1907. Serial No. 351,410.

*To all whom it may concern:*

Be it known that I, HERBERT COTTRELL, a citizen of the United States, residing at Newark, in the county of Essex and State of New Jersey, have invented a new and useful Vehicle-Spring Check, of which the following is a specification.

My invention relates to improvements in spring checks, in which an adjustable cylindrical clamping case formed of two divisions, which may be attached to the vehicle body by means of an extension from the upper division thereof, and which is adapted to be utilized to press upon the surface of a cylindrical crank hub, provided with a lever arm extension, which may by means of a connecting rod, be attached to the lower spring or axle of the vehicle; the system arranged thus, being adapted to afford frictional resistance to rapid spring compression or extension to absorb concussion or shock.

I attain these objects by the mechanism illustrated in the accompanying drawings, in which—

Figure 1 is a vertical rear view of the entire apparatus. Fig. 2 is a vertical side view of connecting rod on line $y\ y$ Fig. 1 with the plate $r$ reversed. Fig. 3 is a sectional view of case and hub on line $x\ x$ Fig. 1. Fig. 4 is a top view of upper division of case. Fig. 5 is a bottom view of lower division of case. Fig. 6 is a front view of plate $s$ Fig. 3.

Similar letters refer to similar parts in the several views.

Upon the upper portion of case $a$ is formed an attaching plate which may be fastened to the vehicle body by means of screws through holes $e\ e\ e$; and which may be braced by means of extension $m$ protruding under the vehicle body; the hinge section $l'$ is adapted to join to hinge sections $l\ l$ of case $b$ to form a hinge to join the divisions of case $a$ and $b$. The case may be clamped by means of bolt $f$ through holes $w\ w'$ in lugs $g\ g'$. In Fig. 3 the crank hub $k$ is a cylinder having circumferential wedge-like projections, and is adapted to operate within the cylindrical casings $a, b$ with an interposed lining of "Babbitt metal" $i$. The lever arm $c$ is attached to hub $k$ by being set into a recessed slot across the end thereof, and secured by screw $j$. The connecting rod $d$ is preferably formed of two strips of metal of identical shape as $d\ d$ Fig. 2 joined by riveting as at $n\ n$, and pivoted at $o$ to lever $c$ and at $p$ to plate $r$. Plate $r$ is used to attach the system to lower spring or axle of the vehicle.

To provide for adjusting the casings $a\ b$ to clamp the hub $k$, they are formed so as to be separate at the dividing line, the space between being filled with felt or like material as at $h\ h$ Fig. 1, the felt $h\ h$ filling the joint elastically, serves to exclude dust and may be used to carry a lubricant.

The device operates as follows: Plate $a$ is attached to the vehicle body, and bolt $f$ screwed upon lugs $g\ g'$ of casings $a\ b$ to the required degree of clamping tension upon hub $k$; the lever arm $c$ being connected pivotally at $o$ with connecting rod $d$ which, is also pivotally connected at $p$ with plate $r$; and plate $r$ is then attached to lower spring or axle of the vehicle. Any sudden movement of the vehicle springs as to their compression or extension will then be resisted by the clamping friction of casing $a\ b$ upon hub $k$, the effectiveness of which is aided by the circular wedge-like projections thereof being received into like recesses in casings $a\ b$ with an interposed lining $i$ of "Babbitt metal". The joint in casings being filled by felt $h$, or like material, for excluding dust, and to carry a lubricant and feed the same to hub $k$, and "Babbitt metal" $i$. The plate $s$, Figs. 3 and 6 is to inclose the end of casings and give finish to the appliance; and is secured thereto by means of screws $t\ t$, through holes $v\ v$ which may be enlarged or elongated to provide for adjustment of casings $a\ b$.

What I claim and desire to secure by Letters Patent is—

1. A vehicle spring check, comprising a longitudinally divided clamping case, adapted to be attached to vehicle body, and to be adjusted in clamping frictional contact with an internal cylindrical crank hub provided with circumferential wedge rings upon its surface, and a lever arm and connecting rod, to attach to lower spring or axle; to resist rapid spring compression or extension; substantially as described.

2. An adjustable spring check, comprising a divided hinged cylindrical clamping case lined with "Babbitt metal", adapted to be attached at its upper division to vehicle body, and to clamp an internal oblong crank hub having circumferential wedge rings upon its surface and a lever arm extension with connecting rod attached thereto to connect to lower spring or axle, to resist rapid spring compression or extension, substantially as described.

In testimony whereof, I have signed my name to this specification in the presence of two subscribing witnesses.

HERBERT COTTRELL.

Witnesses:
   HOWARD C. COTTRELL,
   JENNIE M. CROOKE.